United States Patent [19]

Petroff

[11] 4,344,329
[45] Aug. 17, 1982

[54] FLOW ANALYZER

[76] Inventor: Peter D. Petroff, Penthouse No. 2, Marbella Del Caribe, Este, Isla Verde, P.R. 00913

[21] Appl. No.: 264,644

[22] Filed: May 18, 1981

Related U.S. Application Data

[62] Division of Ser. No. 104,540, Dec. 17, 1979, Pat. No. 4,295,197, which is a division of Ser. No. 905,196, May 12, 1978, Pat. No. 4,211,111, which is a division of Ser. No. 811,557, Jun. 30, 1977, Pat. No. 4,116,061, which is a division of Ser. No. 602,974, Aug. 8, 1975, Pat. No. 4,070,563.

[51] Int. Cl.³ .............................................. G01F 1/52
[52] U.S. Cl. ..................................... 73/861; 73/299
[58] Field of Search .................. 73/861, 299; 364/510

[56] References Cited

U.S. PATENT DOCUMENTS

| | | | |
|---|---|---|---|
| 4,070,563 | 1/1978 | Petroff | 73/299 |
| 4,116,061 | 9/1978 | Petroff | 73/299 |
| 4,211,111 | 7/1980 | Petroff | 73/299 |
| 4,221,127 | 9/1980 | McClure | 73/861 |
| 4,295,197 | 10/1981 | Petroff | 73/299 |

Primary Examiner—Donald O. Woodiel
Attorney, Agent, or Firm—C. A. Phillips

[57] ABSTRACT

A sewer flow measurement system for determining flow conditions of a sewer line system wherein separately located monitors make and record precisely synchronized and time identified pressure measurements, utilizing pressure-to-signal transducers positioned on the bottom of pipes where they exit into manholes. A cassette recorder records the different pressure related signals from the monitors together with a discrete identification signal from each monitor. The outputs of the recorder are then fed to a pressure-to-flow computer which provides location identified, time synchronized, flow data for the system.

8 Claims, 7 Drawing Figures

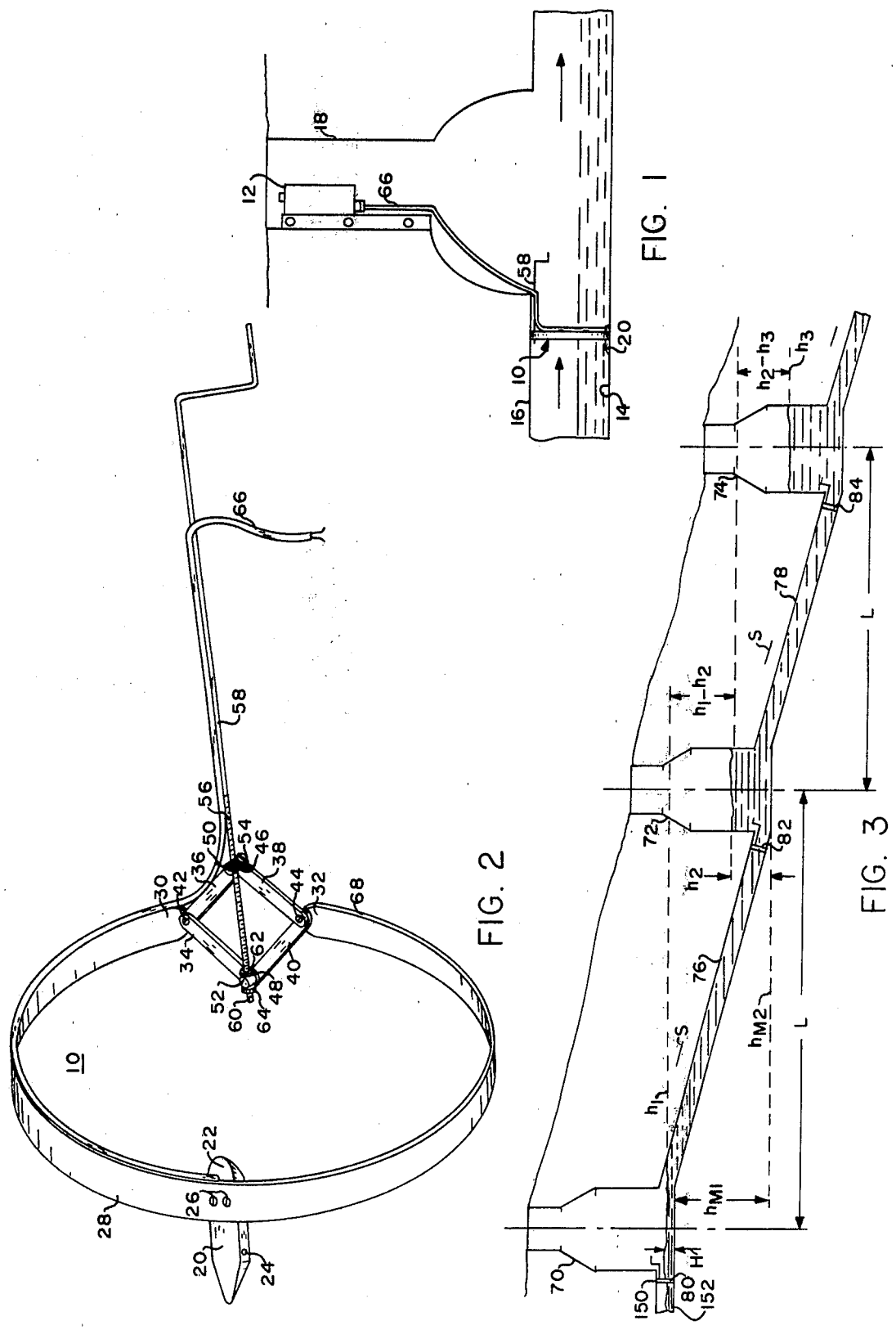

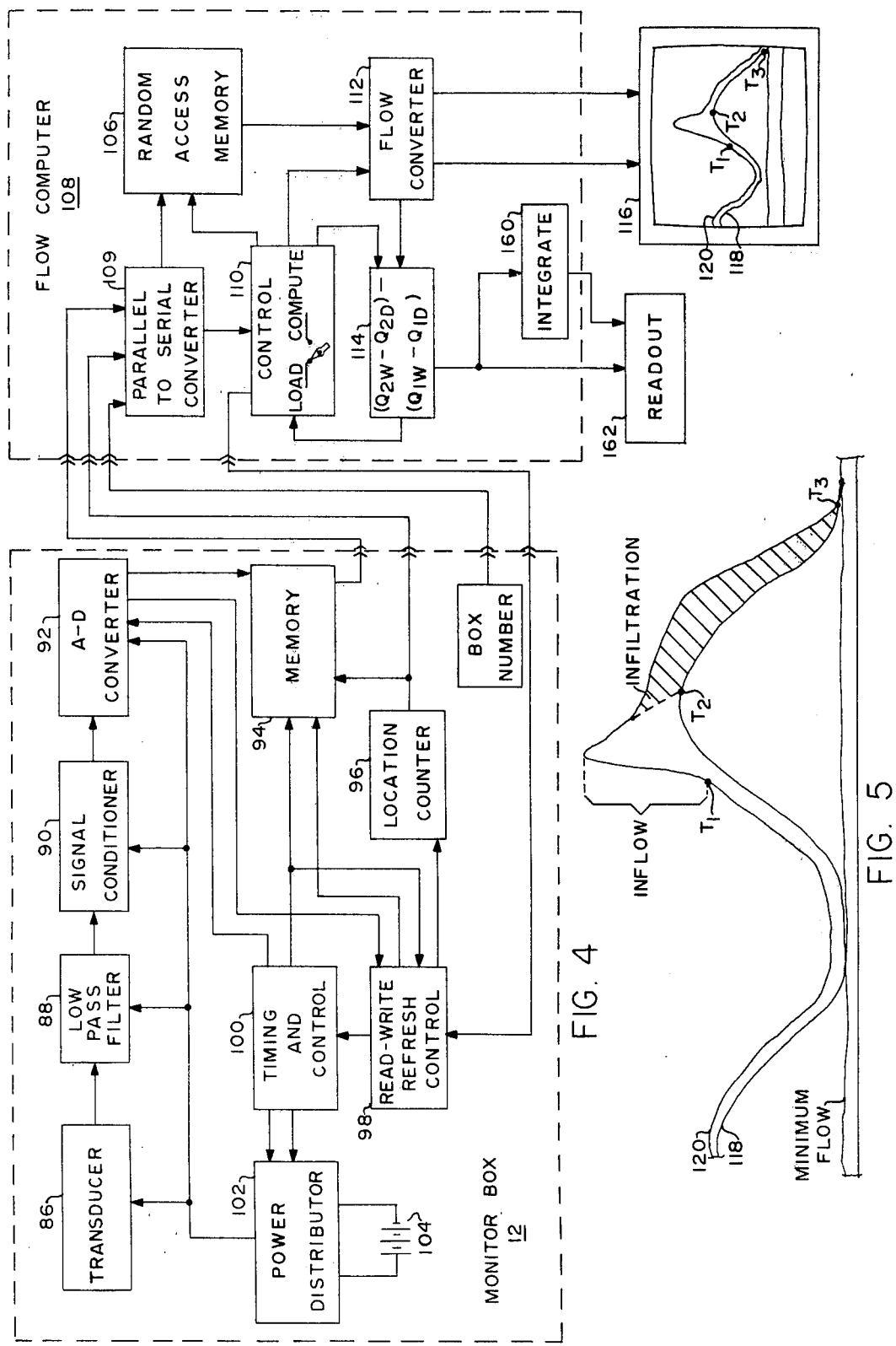

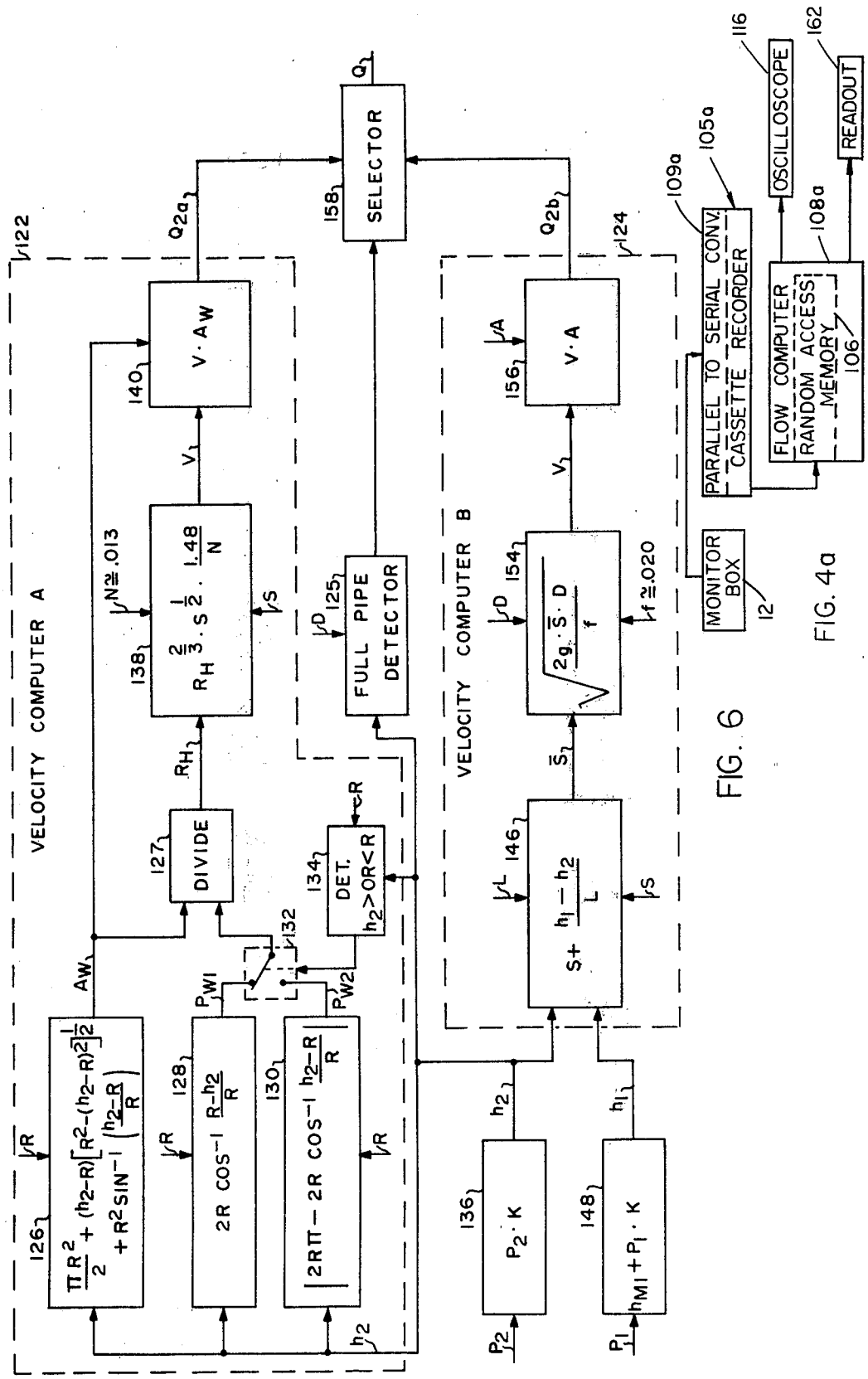

FLOW ANALYZER

This is a division of application Ser. No. 104,540, filed Dec. 17, 1979, now issued as U.S. Pat. No. 4,295,197, issued Oct. 13, 1981, which is a division of application Ser. No. 905,196, filed May 12, 1978, now issued as U.S. Pat. No. 4,211,111, issued July 8, 1980, which is a division of application Ser. No. 811,557, filed June 30, 1977, now issued as U.S. Pat. No. 4,116,061, issued Sept. 26, 1978, which is a division of application Ser. No. 602,974, filed Aug. 8, 1975, now issued as U.S. Pat. No. 4,070,563, issued Jan. 24, 1978.

BACKGROUND OF THE INVENTION

1. Field of the Invention

This invention relates to methods and systems for determining the extent, respectively, of drainage water which flows into sewage pipes (inflow) and through seepage (infiltration) into sewer lines.

2. General Description of the Prior Art

It is unfortunately true that most of the sewer systems in this country, if not in the world, are overloaded during wet periods. Massive amounts of money have been appropriated in this country to assist cities in the expansion and/or repair of their sewer systems, and presently efforts are almost frantically being made to get on with this work. A major stumbling block is that enormous quantities of surface drainage water are entering their systems; and before new sewage facilities can be adequately planned for and constructed, it is necessary to locate and do away with, or materially reduce, this non-sewage so that proper types and sizes of plants can be planned and built.

The first problem is, of course, that of identification of where the water is entering the lines, and second, whether it is caused by drain lines undesirably connected to sewer lines or by pipe leakage through cracks or faulty pipe joints. Insofar as the applicant is aware, efforts to solve these problems have at best involved uncoordinated, in time, measurements of fluid levels in manholes, and these have not been productive of a solution. For one thing, as a practical matter, fluid level in a manhole is a quite unreliable indice of flow through a particular manhole of a system. This follows since the size and shape of manholes and elevation and capacity of exit pipes from them are factors which influence the relation of fluid level to flow, and these parameters typically vary from manhole to manhole within a system.

SUMMARY OF THE INVENTION

The applicant has discovered that one must not only be able to locate, reasonably closely, for example, between which two manholes water is entering a sewer pipe, but also the nature of the leakage into the pipe if the problem is to be efficiently solved. He has discovered that by monitoring flow during not only rainfalls, and comparing the monitored results with dry day data for each manhole, that one can determine not only the quantity of flow resulting from rainfall in a particular run of pipe, but also whether there is some underground drain pipe supplying this water, or whether it is occurring by virtue of defective pipes, or both. It is to be noted that many sewer lines are 50 to 100 years old, or older, and there are numerous drain lines that have been connected into sewer lines without the knowledge of sewer authorities, or at least without a record being kept of their existence. The applicant has found that by comparing the differences in flow between dry and wet periods, the quantity of water into a sewer line through drain line taps can be determined by monitoring flow precisely during the course of a rain; and that drain water, or infiltration, due to leaky sewer pipes, can be determined by observing the difference between dry-wet difference readings between ends of a pipe for a period commencing at the end of a rain and continuing until the difference substantially disappears. The applicant further discovered that direct flow measurements, and particularly flow measurements made in manholes, are often insufficiently accurate to determine actual flow through sewer pipes for two reasons. One, flow is typically computed employing some form of velocity measurement device or level sensor inserted into a manhole. In order to accurately determine flow from either velocity of flow in a manhole or level of liquid in a manhole, the volume and dimensions of the manhole from which the measurement is being made must be known. The difficulty with this is that typically manhole dimensions and volumes vary from manhole to manhole within a single sewer system and often are not readily known.

In recognition of this, and as a feature of the present invention, the applicant does not make velocity measurements or manhole level measurements as such, but rather pressure measurements, and does not make them in a manhole, but in the end of a pipe which has an accurately-known diameter.

The thus obtained data would be next transferred to the memory of a centrally located data processor containing selection means for recalling any particular data words from any monitor, converting the recorded pressure values to flow in terms of pipe size and making the comparisons with other data words to thus particularly compute flows and flow differences at particular times, and to sum same for a particular period. Thus, liquid entering a sewer pipe between manholes is identified as to inflow or infiltration, and the rate of flow of each, and summation of each, is determined for that period.

A still further feature of this invention is that the applicant employs a pressure transducer and an expandable positioning assembly which enables a pressure transducer to be readily inserted in a pipe at a desired distance from the mouth of the pipe for precise measurements. Once a series of measurements have been made, say, over a 30-day period, the assembly can be readily removed.

As still a further feature of this invention, a self-contained, self-powered monitor is installed in each of a group of manholes. The monitors are synchronized to record pressure readings at a selected rate, say each 15 minutes, and the pressure readings are stored in a memory in each monitor. In the event that monitors are left in place beyond storage capacity time, means are provided to drop the earliest recorded data and thus preserve the full stored set of coordinated data extending from the time of interrogation of each memory back for a period equal to the storage time of the memories.

When it is desired to analyze the stored data from monitor units placed in various manholes along a sewer line, the thus recorded data is typically transferred to a buffer storage in the form of a simple cassette recorder which would be taken around to each of the manhole monitoring units. Each monitoring unit would, in addition to providing time identified pressure, also provide a monitor (manhole) location identification signal which would be encoded with each monitor.

BRIEF DESCRIPTION OF THE DRAWINGS

FIG. 1 is a schematic illustration of the installation of a pressure sensing and monitoring unit as contemplated by this invention.

FIG. 2 is a pictorial view of a pressure sensing assembly adapted to be placed and held in a sewer pipe.

FIG. 3 is a schematic illustration of a portion of a sewer system and with dimensional labels representative of elements of computations necessary to convert pressure measurements into flow measurements.

FIG. 4 is an electrical schematic diagram illustrative of the monitoring and measurement system of the invention.

FIG. 4a is an electrical schematic diagram illustrative of an alternate form of a detail of the system shown in FIG. 4.

FIG. 5 is a plot of flow through a pipe versus time.

FIG. 6 is an electrical schematic diagram illustrative of flow computation circuitry as contemplated by this invention.

DETAILED DESCRIPTION OF THE DRAWINGS

Referring to the drawings, FIGS. 1 and 2 illustrate the installation of pressure sensing assembly 10 and monitor 12 within an end portion 14 of sewer pipe 16 and manhole 18, respectively. Analog-type liquid pressure sensor 20, having, for example, an operating range of 0 to 120 inches of water, and which has an outer housing 22. Housing 22 includes an appropriate opening 24 wherein sensor 20 may be engaged by environmental liquid. Housing 22 is streamlined to reduce resistance to flow and is attached by bolts 26 to expandable circular strap 28, which is adjustably interconnected at ends 30 and 32 by pivotally interconnecting parallel bars 34, 36, 38, and 40. Pivot points 42 and 44 are connected to ends 30 and 32, respectively, of strap 28; and pivot points 46 and 48 are interconnected by shoulder pins 50 and 52. Shoulder pin 50 is threadably engaged through lateral hole 54 over threaded end region 56 of clamp actuating handle 58. Pivot pin 52 is rotatably engaged over outer end region 60 of handle 58 and is axially supported to handle 58 by collars 62 and 64. When actuating handle 58 is rotated so as to reduce the distance between pivot pins 50 and 52, the diameter of circular strap 28 is increased. Conversely, when handle 58 is rotated in the opposite direction, increasing the distance between pivot pins 50 and 52, the diameter of clamp 28 is reduced. Electrical cable 66 is routed about trailing edge 68 of clamp 28 upward along actuating handle 58.

In order to install clamp assembly 10 within sewer pipe 16, actuating handle 58 is turned in a direction to decrease the diameter of clamp 28. Clamp 28 is then inserted as shown in FIG. 1, with pressure sensor 22 positioned in the lower region of pipe 16 inward of the opening of pipe 16. Handle 58 is then rotated in a direction so as to expand clamp 28 and thus urge the outer periphery of clamp 28 into firm engagement with the inner periphery of entrance pipe 16, and thereby provide substantial support for pressure sensor 20, which is adjacent the bottom of pipe 16 as shown in FIG. 1.

FIG. 3 illustrates a portion of a sewer system wherein three manholes, 70, 72, and 74, are interconnected with pipes 76 and 78. It illustrates flow through a sewer line, and this drawing labels parameters from which pressure as measured by pressure sensor assemblies 80, 82, and 84 is convertible into actual flow, as will be further discussed.

FIG. 4 illustrates schematically the circuitry of the system of measurement of this invention. Pressure transducer 86 typically provides an output from 0 to 5 volts representative of the pressure range of 0 to 5 PSI. Its output is filtered by low-pass filter 88 to eliminate electrical pickup from extraneous sources. The thus filtered output is conditioned in signal conditioner 90 which normalizes the gain and balances offsets and is then fed to analog-to-digital converter 92 which converts this output to a digitally encoded representation of pressure.

Memory 94, in which the outputs from A-D converter 92 are stored, is of the dynamic N-channel MOS type, and, for example, would have 2,048 eight-bit memory locations to thus enable storage of data sampled at 15-minute intervals for more than 21 days. The locations are sequentially addressable, and thus knowing the time of storage of the first sample and rate of sampling, location counter 96 thus identifies the time of sampling.

Location counter 96, responsive to input count pulse, counts up and provides a count to memory 94 to step it between the sequentially identified memory locations.

Read-write-refresh control 98 is conventional and performs these labelled functions. It continually refreshes memory 94 by re-establishing "ones" in each memory location where there is a "one" and "zeroes" in each memory location where there is a "zero", the refresh cycle being once every two milliseconds. This unit also provides a "write" pulse each sample cycle to memory 94, which causes it to write into a memory location, determined by location counter 96, the digitally encoded pressure value from A-D converter 92. Timing and control 100 contains a master clock oscillator and appropriate dividing circuits to time the operation of monitor 12, including the provision of power "turn on" and "turn off" pulses to power distributor 102, the provision of "convert" pulses to A-D converter 92 and a "refresh" signal to read-write-refresh control 98. The unit labelled box number is a wired logic unit which provides continuously an identification number of that monitor, which later identifies each data file which is coming from a particular monitor. Power distributor 102 connects operating bias from battery 104 to all circuits of monitor 12, power being supplied to transducer 86, low-pass filter 88, signal conditioner 90, and A-D converter 92 in response to control signals from timing and control 100.

In operation, the following sequence of events occur; and, for example, it will be assumed that pressure sampling measurements are to be taken at a rate of one each 15 minutes. Thus, this timing and control is set to achieve this cycle of operation:

1. Power distributor 102 is manually operated to apply power to all of the units of the monitor other than those which will be specifically turned on in step 2. Upon "turn on", location counter 96 is initially reset to a zero count representative of first memory location of memory 94.

2. All clock oscillators of all monitors are manually, or otherwise automatically, turned on at the same time in each set.

3. Timing and control of each monitor provides at a selected time a "turn on" pulse to power distributor 102 which connects operating bias from battery 104 to transducer 86, low-pass filter 38, signal conditioner 90, and A-D converter 92.

4. Approximately eight seconds after the turn on pulse to the power distributor 102, timing control 100 provides a "convert" pulse to A-D converter 92, which causes A-D converter 92 to convert the analog pressure value at its input to digitally encoded value.

5. At the end of A-D conversion, A-D converter 92 sends an "end of conversion" pulse to read-write control 98.

6. Read-write-refresh control 98 then sends to memory a "read" signal which causes the digital output word from A-D converter 92 to be written into the first memory location.

7. Next, read-write-refresh control 98 sends a count pulse to location counter 96 to step it to "count two", and location counter 96 in turn responsively causes memory 94 to be set to receive the next sample in sequential memory location.

8. These events require a finite period of time; and, accordingly, after the occurrence of that time, timing and control 100 provides a "turn off" pulse to power distributor 102 which removes operating bias from transducer 86, low-pass filter 88, signal conditioner 90, and A-D converter 92. Power remains on the other elements of the system.

The preceding sequence is repeated at the preset cycle rate commencing with the provision of a "turn on" pulse by timing and control 100 to power distributor 102. Typically, recording periods would extend over approximately a 30-day period, during which time there would have occurred samples of dry and rainfall periods. For purposes of illustration, only three measurement locations, as illustrated in FIG. 3, are shown. However, it is to be appreciated that there would be a greater number of locations monitored in a typical sewage system. FIG. 3 also labels quantities which are used in translating or computing pressure data into flow data, as will be further described.

At the end of a data collection period, the data stored in each memory of each monitor is transferred to random access memory 106 of flow computer 108, which, for example, we will assume is accomplished by actually removing the monitors and taking them while being powered to a central location or taking a mobile flow computer to each of the monitors. Alternately, as shown in FIG. 4a transfer would be achieved by means of an intermediate recorder 105a, such as that of a cassette recorder which would be taken around to each monitor and the data in the memories of each transferred to the cassette recorder, being converted in the process transfer from parallel to serial form by a parallel-to-serial converter indicated by the numeral 109 when included in flow computer 108 and by 109a when in separate recorder unit 105a. From cassette recorder 105a, it is supplied the flow computer, in this case, designated in FIG. 4a as 108a. In any event whether directly from a monitor or through a separate parallel/serial converter and recorder combination as shown in FIG. 4a, each data word from each monitor is transferred in a conventional fashion to random access memory 106, each data word recorded comprising a pressure sample, the sample number (representative of the time of the data sample), and the box number of the particular monitor.

Control 110 of flow computer 108 is conventional in that it is subject to programming by an operator to recall any selected data word in random access memory 106 and provide it as an output to flow converter 112. Control 110 also would typically include means for selecting computations to be made in subtraction unit 114, as will be further described. Flow converter 112, which functions to convert pressure values to flow values in millions of gallons per day, applies converted value to, for example, an oscilliscope 116 which functions as a curve tracer to display pertinent sets of data. As shown, curve 118 is traced from flow calculated data for a typical "dry" 24-hour period and curve 120 for a day on which a rain commenced at time point $T_1$ and ended at time point $T_2$.

Flow from a particular pipe, say, for example, pipe 76, as illustrated in FIG. 3, is determined by flow computer 112 which is shown in detail in FIG. 6. It is basically divided into two computation systems, partially filled pipe velocity computer, A, 122 and full pipe velocity computer, B, 124. Depending upon which condition exists (a full pipe or less than full—the results from the appropriate one of these computers is employed for further processing). This condition of filled or not filled pipe may be detected from the value of a pressure measurement from transducer 86, or, as shown, from an output of full pipe detector 125, indicating that pipe 76 is full. Assuming that pipe 76 is not full, the sequence of computations are as follows for each increment of data, that is, for each pressure measurement. The order of computations is controlled by conventional logic control means contained in control 110, which means are not shown, as follows:

1. Computation unit 126 receives a pressure value and the radius R of pipe 76 and performs the function shown to obtain an output $A_W$, wetted area, of the pipe at location 82, where in this illustration, transducer 86 is positioned.

2. Next, the quantity $R_H$, hydraulic radius, is determined by divider 127 which divides the cross section of the wetted area $A_W$ by a wetted pipe perimeter $P_W$. Depending upon whether or not pipe 76 is more or less than half full, that is, the water level is greater than or less than the radius of the pipe, output $P_{W1}$ from computer 128, or $P_{W2}$ from computer 130, would be provided through selector 132 to divider 127. This selection is controlled by half pipe detector 134 which receives a liquid height signal from multiplier 136 and input R equal to the radius of the pipe and provides a selected output to divider 127 under the criteria stated. Computers 128 and 130 perform the computations indicated on the blocks, receiving also radius dimension inputs for the pipe in question and a liquid height $h_2$ input, as illustrated in FIG. 6.

3. Next, computing element 138 solves the problem shown in the box representative of that element, and whereby $R_H^{2/3}$ is multiplied by $S^{1/2}$ times 1.48 and divided by a constant of an approximate value of 0.013. The result is an indication of velocity of flow V in feet per second.

4. Next, velocity in feet per second is multiplied in multiplier 140 by the wetted area $A_W$ to provide an output $Q_{24}$, representative of volume of flow in million gallons per day for conditions when flow level in pipe 76 is less than full.

For conditions when pipe 76 is full, quantity of flow is determined by velocity computer, B, 124 as follows:

1. A height value $h_2$ for the height of liquid above the bottom of pipe 76 at exit and 142 and bottom of manhole 72 is provided by multiplier 136 as a first input to computer 146. Computer 148 receives an input $h_{m1}$, representative of the height of the bottom of manhole 70 with respect to the bottom of manhole 72; an input value $P_1$ from pressure sensor assembly 80 positioned at point 150 of pipe 152; and an input K, representative of a constant for the conversion of liquid pressure to height of liquid in pipe 152 and manhole 70. Computer 148 then multiplies input $P_1$ times constant K and adds to the product $h_{m1}$ to provide as a second input to computer 146 $h_1$, or height of liquid in manhole 70, and height at the mouth of pipe 76 with respect to the bottom of manhole 72 and exiting at end 142 of pipe 76.

2. The values $h_1$ and $h_2$, together with $L_1$, distance between manholes 70 and 72, and S, slope of pipe 76 per 1,000 feet, are combined as illustrated in computer 146.

3. The resulting quantity $\bar{S}$ from step 2 is fed to computer 154 wherein the computation shown is made of taking the square root of 2 g (gravity) $\times \bar{S} \times D$ (diameter of pipe)+f, a constant having an approximate value of 0.020. This provides quantity V, velocity of flow through pipe 76.

4. The value of V is then fed to flow calculator 156 wherein the area of pipe 76 is multiplied by velocity V to produce a quantity labelled $Q_{2B}$, flow in million gallons per day.

At this point, it is necessary to determine which calculation is to be used, the partially filled pipe or the filled pipe computation; and accordingly, both quantities $Q_{2A}$ and $Q_{2B}$ are fed to selector 153 which is a switch controlled by full pipe detector. Selector switch 158, responsive to the condition of a full pipe, provides as an output term $Q_{2B}$, but otherwise provides an output $Q_{2A}$.

As will be noted in FIG. 4, there is an output from flow converter 112 to subtract unit 114, and with reference to manholes 70 and 72 and pipe 76 interconnecting them as shown in FIG. 3, the indicated subtractions of flows and differences of flows is made by subtraction unit 114 and are in terms of flows for dry and rainy days as registered by monitors associated with these two manholes. To perform the calculations indicated on subtraction unit 114, control 110 would first transfer pressure readings from memory to flow converter 112, and these readings converted to flow for a time $T_1$. As shown, the term used of $Q_{1T}$ is indicative of a rainy day reading at time $T_1$ on a given day, and the term $Q_{1D}$ is indicative of a reading at that same time on a dry day. These readings both come from a monitor and transducer 82 associated with manhole 72. Subtraction unit 114 first subtracts these quantities and thus obtain a flow difference for a rainy day. Thereafter, the same process is followed with respect to a rainy and dry day readings for the same time and days from a monitor and transducer 80 associated with manhole 70. In this instance, the counterpart terms are $Q_{2W}$ and $Q_{2D}$. These quantities are subtracted, and a rainy day difference flow for manhole 70 is obtained. Finally, the flow difference registered for manhole 72 is subtracted from the difference made from manhole 70, and the result is indicative of leakage or other undesired flow into pipe 76. Assuming that, as we discussed above, the time of these readings coincided with a time just after a rain commenced, before which it had been dry, it could be reasonably assumed that this undesired flow is attributable to some drain pipe connected at some point into sewer pipe 76 between manholes 70 and 72. By progressively making readings and computations as indicated during the time from $T_1$ to $T_2$, corresponding in general to a period of rain and integrating these readings, the volume of undesired flow or "inflow", as it is termed, may be determined. By continuing like sets of measurements and computations beyond $T_2$, which is after rain has stopped, as, for example, on to $T_3$, there will be obtained difference readings attributable to "infiltration" into pipe 76. By integrating this data in integrator 160, the sum of infiltration during the period $T_2$ to $T_3$ would be obtained and supplied to readout 162. Readout 162 would be conventional and typically would be a line printer to provide a line printout of the computed data.

For pressure measurements to accurately indicate height of the liquid in a pipe, the measurements should be made at least 0.8 of a pipe diameter in the pipe from the exit end of the pipe, thus handle 58 should be at least this length, and typically would be of a length in the range of 0.8 to 5 times the diameter of pipe with which pressure sensor assembly 10 is to be used.

What is claimed is:

1. A system of measurement of flow rates occurring in a sewer system having at least two, first and second, manholes located within the system, and there being a first sewer pipe with an exit end at said first manhole, and a second sewer pipe having an exit at said second manhole, said system of measurement comprising:
at least first and second monitoring assemblies, said first monitoring assembly being located at said first manhole, and said second monitoring assembly being located at said second manhole, and wherein each monitoring assembly comprises:
liquid height sensing means comprising a pressure-to-electrical signal transducer for sensing liquid height in a pipe and providing as an output a signal which is a function of such liquid height,
mounting means for positioning said transducer in a said exit end region in a said sewer pipe and adjacent the bottom of that sewer pipe,
timing means, synchronized with timing means in each other said monitoring assemblies, for providing time signals,
analog-to-digital conversion means responsive to timing signals from said timing means and signals from said liquid height sensing means for periodically, at a selected rate, converting said height signals into digitally encoded, time identified, liquid height representative signals, and
memory means responsive to said analog-to-digital conversion means for storing discrete time identifiable said digitally encoded height representative signals covering periodic measurements over a selected period of time;
transfer storage means including a storage medium, and responsive to said first and second monitoring assemblies, for storing height signals of said memory means of said first and second monitoring assemblies; and
conversion means responsive to said transfer storage means for converting said digitally encoded signals derived from said monitoring assemblies to timewise relatable liquid flow rates.

2. A system as set forth in claim 1 wherein each said monitoring assembly includes means for supplying a discrete monitoring assembly identification number to said transfer storage means.

3. A system as set forth in claim 2 wherein said second manhole is upstream in said sewer system from said first manhole.

4. A system as set forth in claim 3 further comprising computation means responsive to said conversion means for determining the difference between flow rates from said first pipe and said second sewer pipe.

5. A system as set forth in claim 2 wherein said transfer storage means comprises a magnetic type recorder.

6. A system as set forth in claim 5 wherein said magnetic type recorder is a tape recorder.

7. A system as set forth in claim 6 wherein said tape recorder is a cassette type recorder.

8. A system as set forth in claim 1 wherein each of said sewer pipes between a said mounting means and the exit end of that pipe is unobstructed.

* * * * *

UNITED STATES PATENT AND TRADEMARK OFFICE
CERTIFICATE OF CORRECTION

PATENT NO. : 4,344,329

DATED : August 17, 1982

INVENTOR(S) : Peter D. Petroff

It is certified that error appears in the above-identified patent and that said Letters Patent is hereby corrected as shown below:

The term of this patent subsequent to January 25, 1995 has been disclaimed.

Signed and Sealed this

Fifth Day of April 1983

[SEAL]

Attest:

Attesting Officer

GERALD J. MOSSINGHOFF

Commissioner of Patents and Trademarks